(12) United States Patent
Chelin et al.

(10) Patent No.: US 8,628,635 B2
(45) Date of Patent: Jan. 14, 2014

(54) METHOD FOR MAKING A NETWORK OF DRAINAGE PIPES AND ACOUSTIC PROCESSING PANEL INCLUDING SUCH A NETWORK OF DRAINAGE PIPES

(75) Inventors: Frederic Chelin, Encausse (FR); Christophe Menier, Saint Jean de Boiseau (FR); Jean Yves Thomy, Brains (FR); Etienne Bertin, Toulouse (FR); Thierry Surply, Cornebarrieu (FR); Dominique Haro, Tournefeuille (FR); Fabrice Gantie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/147,471

(22) PCT Filed: Jan. 29, 2010

(86) PCT No.: PCT/FR2010/050145
§ 371 (c)(1),
(2), (4) Date: Mar. 12, 2012

(87) PCT Pub. No.: WO2010/089497
PCT Pub. Date: Aug. 12, 2010

(65) Prior Publication Data
US 2012/0152443 A1    Jun. 21, 2012

(30) Foreign Application Priority Data

Feb. 3, 2009  (FR) .................................. 09 50663
Sep. 23, 2009 (FR) .................................. 09 56554

(51) Int. Cl.
    *B29C 70/30*    (2006.01)
(52) U.S. Cl.
    USPC .......................................... 156/245; 156/219

(58) Field of Classification Search
    USPC .......................................................... 156/245
    See application file for complete search history.

(56) References Cited

U.S. PATENT DOCUMENTS

| | | | | |
|---|---|---|---|---|
| 3,516,895 A | * | 6/1970 | Hartman | 428/116 |
| 4,384,634 A | * | 5/1983 | Shuttleworth et al. | 181/213 |
| 7,097,731 B2 | * | 8/2006 | Puriefoy et al. | 156/292 |

(Continued)

FOREIGN PATENT DOCUMENTS

| | | |
|---|---|---|
| EP | 1 232 944 A1 | 8/2002 |
| FR | 950 663 A | 7/1947 |

(Continued)

OTHER PUBLICATIONS

International Search Report, dated May 4, 2010, from corresponding PCT application.

*Primary Examiner* — Philip Tucker
*Assistant Examiner* — Vicki Wu
(74) *Attorney, Agent, or Firm* — Young & Thompson (57) ABSTRACT

A process for producing a panel for acoustic treatment including a resistive porous layer, an alveolar structure, a reflective layer with openings, and a drainage plate having a furrow for delimiting at least one evacuation pipe when the drainage plate is flattened against the free surface of the reflective layer, includes: shaping the reflective layer according to its final geometry, affixing a demolding film on at least one portion of the free surface of the reflective layer, positioning on the demolding film a core whose cross-section is adapted to that of the evacuation pipe so that the core covers the openings of the reflective layer, molding the drainage plate on the demolding film and the core, demolding the drainage plate and removing the core and the demolding film, and making the drainage plate integral with the free surface of the reflective layer.

17 Claims, 4 Drawing Sheets

(56) References Cited

U.S. PATENT DOCUMENTS

| | | |
|---|---|---|
| 8,172,037 B2 * | 5/2012 | Porte et al. .................. 181/214 |
| 2002/0139899 A1 | 10/2002 | Porte |
| 2002/0139900 A1 | 10/2002 | Porte |
| 2006/0219475 A1 | 10/2006 | Olsen et al. |
| 2010/0096213 A1 | 4/2010 | Frustie et al. |
| 2011/0291325 A1 * | 12/2011 | Mattia .......................... 264/294 |

FOREIGN PATENT DOCUMENTS

| | | |
|---|---|---|
| FR | 2 912 781 A1 | 8/2008 |
| GB | 2 066 354 A | 7/1981 |
| WO | 02/081210 A1 | 10/2002 |

* cited by examiner

METHOD FOR MAKING A NETWORK OF DRAINAGE PIPES AND ACOUSTIC PROCESSING PANEL INCLUDING SUCH A NETWORK OF DRAINAGE PIPES

BACKGROUND OF THE INVENTION

1. Field of the Invention

This invention relates to a process for the production of a network of drain pipes connected at the level of a panel for acoustic treatment.

2. Description of the Related Art

Techniques have been developed for reducing the noise emitted by an aircraft and in particular the noise emitted by a propulsion system, by using, at the walls of the pipes, panels (also called coatings or structures) whose purpose is to absorb a portion of the sound energy, in particular by using the principle of Helmholtz resonators. In a known manner, a panel for acoustic treatment comprises—from the outside to the inside—an acoustically resistive porous layer, at least one alveolar structure, and a reflective or impermeable layer.

Layer is defined as one or more layers that may or may not be of the same type.

The acoustically resistive porous layer is a porous structure that has a dissipative role, partially transforming into heat the acoustic energy of the sound wave passing through it. It comprises so-called open zones that are able to allow acoustic waves to pass and other so-called closed or filled zones that do not allow sound waves to pass but are designed to ensure the mechanical strength of said layer. This acoustically resistive layer is characterized in particular by an open surface area ratio that varies essentially based on the engine and components that constitute said layer.

A honeycomb can be used to form the alveolar structure. Different types of materials can be used to form the honeycomb.

A metal or composite panel can be used to form the reflective layer.

When the acoustic panel is installed at an air intake of a nacelle, this acoustic panel should also be compatible with a frost treatment. Frost treatment is defined as a process or a system that makes it possible to prevent the formation and/or the accumulation of ice and/or frost.

The documents EP-1,232,944 and EP-1,232,945 describe panels for acoustic treatment that is compatible with a frost treatment that uses hot air. In this case, the alveolar structure comes in the form of bands of cells that are spaced apart or a number of pipes spaced between them. This frost treatment is generally coupled to a drainage system that makes it possible to evacuate the water that may accumulate in the cells of the alveolar structure, in particular in the cells that are arranged in a zone that extends from 3 o'clock to 9 o'clock.

This drainage of water is necessary for limiting the risks of deterioration of the cells of the alveolar structure because of the gel of the accumulated water, for preventing corrosion problems, and for maintaining the acoustic performance levels.

According to one embodiment, the side walls of the cells comprise cut-outs in the top part or in the bottom part in such a way as to link cells together, the cells located at 6 o'clock or close to 6 o'clock, comprising openings at the reflective layer in such a way as to evacuate the water from the panel for acoustic treatment.

This embodiment is not completely satisfactory because the presence of a drainage system coupled to a system for frost treatment with hot air tends to reduce the capability of the acoustic treatment and to generate a stream perturbed at the stream of air entering the nacelle.

At the alveolar structure, the document FR-2,912,781 proposes producing a network of cells that are dedicated to a frost treatment communicating with one another and isolating one or more cells that are dedicated to acoustic treatment and isolated from the cells that are used to make the hot air circulate.

For draining the fluids, the reflective layer comprises openings, and pipes are provided at its free surface (opposite to the one against which the cells of the alveolar layer are attached).

To produce these pipes, a plate called a drainage plate below is applied against the free surface of the reflective layer with furrows that form pipes when said drainage plate is bonded against the free surface of the reflective layer.

So that the drainage is effective, it is necessary that the openings made in the reflective layer empty into the pipes.

However, these openings are generally made before deforming the panel for acoustic treatment. Consequently, after the shaping of the panel for adapting it to the radius of curvature of the nacelle, these openings generally are no longer aligned and their positions are relatively random.

If the drainage plate is attached after the shaping of the panel, it is difficult to determine the shape of the furrows so that they work with the openings.

If the drainage plate is attached before the shaping of the panel, with the deformations of the panel and the plate being random, it may occur that the openings that worked with the pipes before the shaping no longer cooperate afterwards.

According to another problem, the free surface of the reflective layer is not uniform and comprises hollow shapes of cells also called "telegraphing." These surface defects reinforce the difficulty of obtaining airtight pipes for drainage.

BRIEF SUMMARY OF THE INVENTION

Also, the purpose of this invention is to eliminate the drawbacks of the prior art by proposing a process for manufacturing at least one pipe for draining an acoustic panel that makes it possible to ensure a correct positioning of the openings for evacuation of the fluids with said drain pipe.

For this purpose, the invention has as its object a process for the production of a panel for acoustic treatment that comprises an acoustically resistive porous layer, at least one alveolar structure, a reflective layer with openings, and a drainage plate that comprises at least one furrow that makes it possible to delimit at least one evacuation pipe when said drainage plate is flattened against the free surface of the reflective layer, characterized in that it consists in:
  Shaping, if necessary, the reflective layer according to its final geometry,
  Affixing a demolding film on at least one portion of the free surface of the reflective layer,
  Positioning on the demolding film at least one core whose cross-section is adapted to that of the evacuation pipe in such a way that said at least one core covers the openings of the reflective layer,
  Molding the drainage plate on said demolding film and said at least one core,
  Demolding the drainage plate and removing said at least one core and said demolding film,
  Making the drainage plate integral with the free surface of the reflective layer.

BRIEF DESCRIPTION OF THE DRAWINGS

Other characteristics and advantages will emerge from the following description of the invention, a description that is provided only by way of example, relative to the accompanying drawings, in which.

DETAILED DESCRIPTION OF THE PREFERRED EMBODIMENTS

Figure 1:
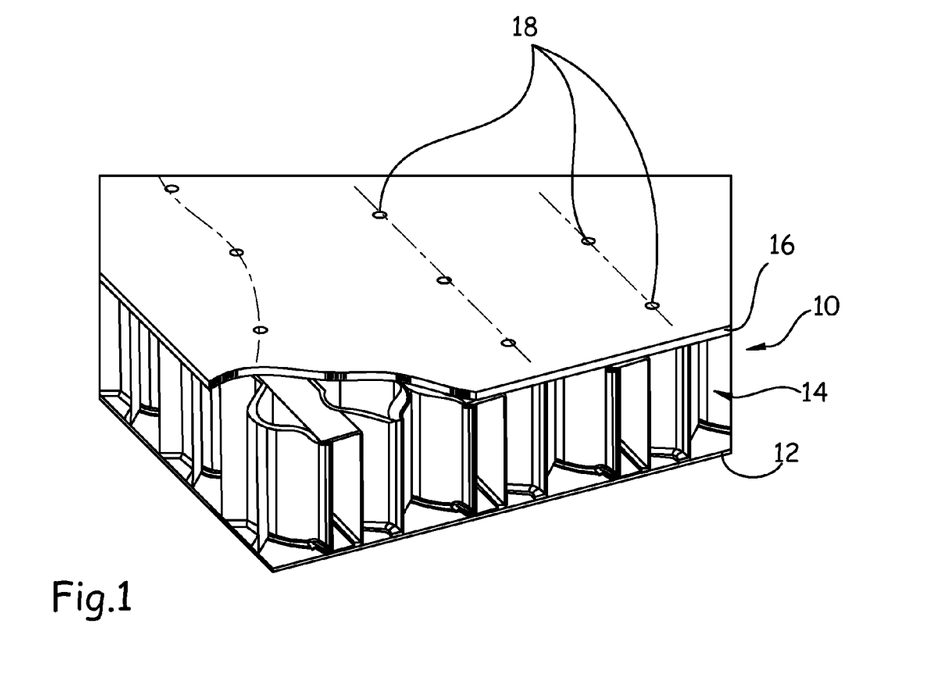
FIG. 1 is a perspective view that illustrates a panel for acoustic treatment with openings for evacuating fluids.

In a known manner, as illustrated in FIG. 1, a panel 10 for acoustic treatment comprises—from the outside to the inside—an acoustically resistive porous layer 12, at least one alveolar structure 14, and a reflective or impermeable layer 16. As a variant, the panel 10 for acoustic treatment can comprise several alveolar structures 14 that are superposed and separated by acoustically resistive layers 12 that are also called a septum.

According to one embodiment, the reflective layer 16 is a metal panel or a panel made of composite material.

According to one embodiment, the alveolar structure 14 can come in the form of a honeycomb structure.

As a variant, the alveolar structure can be such as those described in the documents EP-1,232,944 and EP-1,232,945. Thus, the panel for acoustic treatment that is compatible with a frost treatment using hot air comprises bands of cells that are spaced apart by pipes for channeling hot air that is used for the frost treatment.

According to another variant, the alveolar structure can be such as that described in the patent application FR-0950663.

The acoustically resistive layer, the alveolar structure, and the reflective layer are not described in more detail because they are known to one skilled in the art and can take on different configurations.

The panel for the acoustic treatment comprises a drainage system for evacuating the fluids of said panel. For this purpose, the panel for acoustic treatment comprises, on the one hand, a number of openings 18 made in the reflective layer 16, and, on the other hand, at least one evacuation pipe 20 (visible in FIGS. 5 to 7), generally a network of evacuation pipes 20, at the free surface of the reflective layer (opposite the one against which an alveolar structure is flattened).

Thus, the openings 18 make it possible to link certain zones of the alveolar structure 14 with the evacuation pipes 20 so as to evacuate the fluids that are present inside the panel toward said pipes 20.

The panel for acoustic treatment 10 can be arranged at the surface of a pipe of a nacelle. In this case, the reflective layer 16 is not flat but curved, and the openings 18 cannot be aligned as illustrated in FIG. 1.

According to another aspect, the reflective layer 16 is not generally uniform and can comprise hollow shapes at the cells that are also called "telegraphing."

The acoustic panel comprises a drainage plate 22 with furrows 24, flattened against the free surface of the reflective layer 16 in such a way as to delimit with said reflective layer 16 the network of evacuation pipes 20.

According to the invention, the process for the production of the acoustic panel that is equipped with a drainage system consists in shaping, if necessary, the panel according to its final geometry (such as it will be when the panel will be installed in the zone that requires an acoustic treatment).

According to the invention, the free surface of the reflective layer 16 is used as a mandrel.

Figure 2:
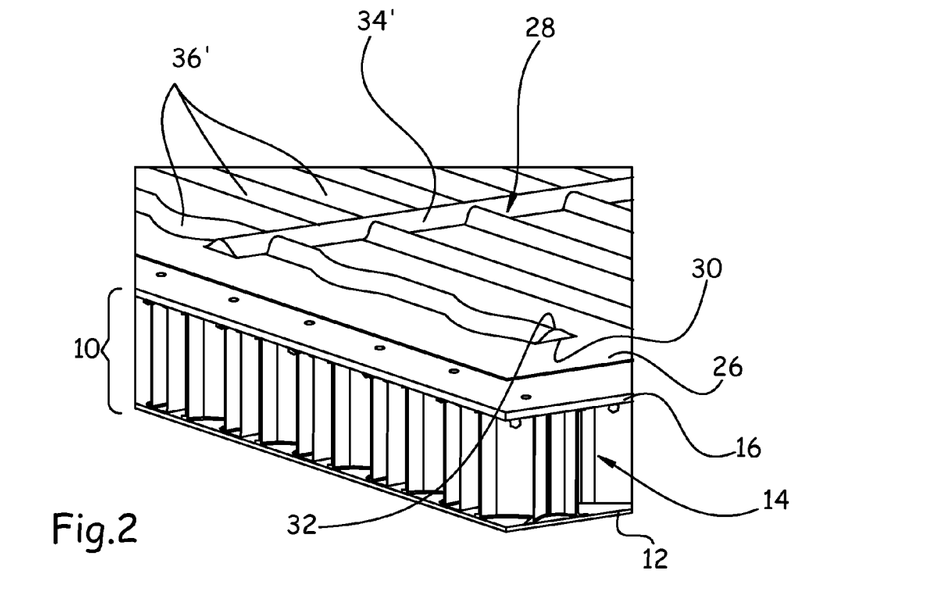
FIG. 2 is a perspective view that illustrates the installation on the reflective layer of a film and a core.

Next, a demolding film 26, for example a polytetrafluoroethylene film, is affixed on at least one portion of the free surface of the reflective layer 16. This film 26 is to be flexible enough for optionally deforming and being flattened as much as possible against the free surface of the reflective layer 16 even if the latter does not have a uniform surface.

This film 26 covers the free surface of the reflective layer on at least one zone that corresponds to the plate 22.

Finally, the type and/or the material of the film 26 is to make it possible to be able to separate a part that is subsequently molded on the mandrel formed by the panel 10.

The film 26 is not opaque but relatively transparent so that the openings 18 are always visible.

As a variant, the film 26 could be replaced by any other element such as a coating that facilitates the demolding and that can be withdrawn so as to allow the bonding of the drainage plate on the free surface of the reflective layer.

Next, at least one core 28 whose cross-section corresponds to the evacuation pipe is applied on the demolding film 26. Preferably, this core 28 has a cross-section with a first essentially flat surface 30 that is intended to be connected to the free surface of the reflective layer 16 and a second rounded surface 32 against which a surface of the drainage plate 22 is able to be flattened.

According to one embodiment, the core 28 is made of repositionable and adjustable silicone.

Adjustable is defined as the core 28 being able to deform in such a way as to cover the openings 18 even if the latter are not aligned.

Repositionable is defined as the surface 30 of the core being able to be bonded and detached from the film so as to adjust the positioning of the core relative to the openings 18 and to be able to reuse the core for the production of several panels 10.

Advantageously, the panel comprises a network of evacuation pipes with at least one primary pipe 34 and secondary pipes 36 of which one first end empties into a primary pipe 34 and of which the other end is obstructed.

In this case, as illustrated in FIG. 2, the core 28 can come in the form of a skeleton with a trunk 34' that corresponds to the primary pipe 34 and branches 36' that correspond to the secondary pipes 36. To set an order of magnitude, the trunk has a cross-section on the order of 30 mm$^2$, whereas the branches have a cross-section on the order of 6 to 7 mm$^2$, or a ratio of a cross-section of a branch/a cross-section of the trunk on the order of ⅓.

As a variant, the trunk and the branches can have variable cross-sections over their lengths. Thus, the branches can have a constriction between two zones at each of which an opening empties.

The trunk and the branches of the core 28 are flexible enough so as to be able to be deformed, if necessary, so as to adapt the geometry of the core to that of the openings 18 so that the latter are covered by the core 28.

When the core 28 is installed, the drainage plate 22 is molded. According to one embodiment, the drainage plate 22 is obtained from folds of fibers immersed in a resin matrix.

Of course, the invention is not limited to these types of fibers and resin.

According to an operating mode, the demolding film 26 and at least one core 28 of folds of pre-impregnated carbon fibers are draped on the panel 10 that is used as a mandrel.

Figure 3:
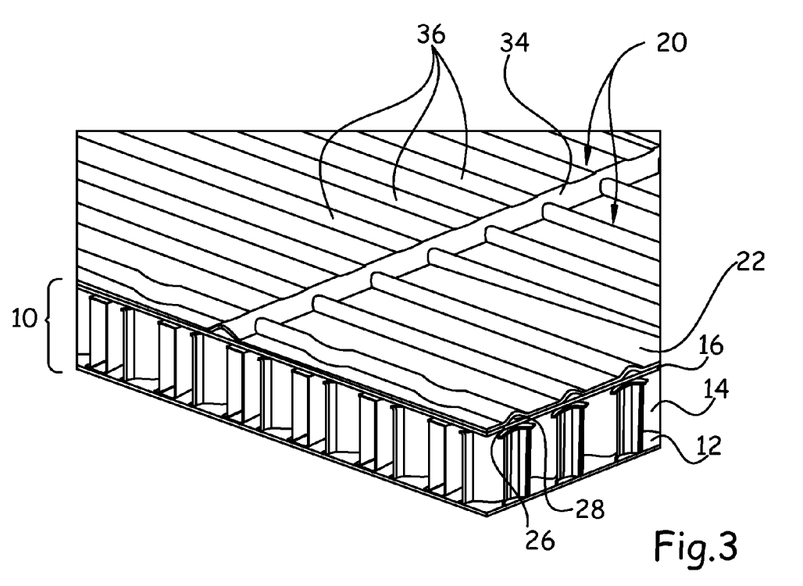
FIG. 3 is a perspective view that illustrates the embodiment of a drainage plate according to the invention on the panel for acoustic treatment.

A panel as illustrated in FIG. 3 is obtained.

The drainage plate 22 is at least partially polymerized in such a way that it is rigid enough to be able to be manipulated.

The drainage plate 22 is preferably entirely polymerized.

Next, the drainage plate 22, the core 28, and the demolding film 26 are removed.

Figure 4:
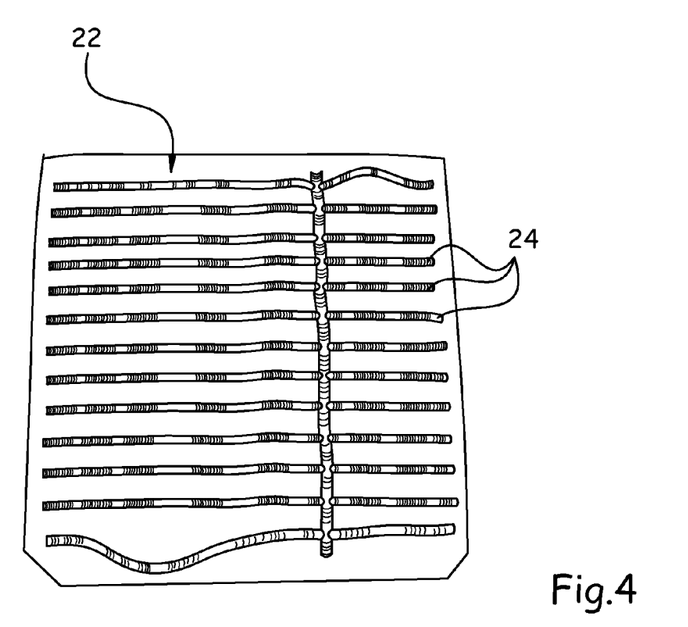
FIG. 4 is a perspective view of a drainage plate after demolding.

As illustrated in FIG. 4, a drainage plate is obtained that comprises—on one of its surfaces (the one in front being flattened against the free surface of the reflective layer)—furrows that correspond to the network of evacuation pipes.

The process according to the invention makes it possible to obtain a drainage plate with a network of pipes adapted to the implantation of openings 18 in such a way that the latter empty well inside the evacuation pipes.

In the same manner, the drainage plate 22 has a relief adapted to that of said layer at the surface that can be in contact with the reflective layer 16. This characteristic makes it possible to guarantee that the drainage plate is indeed in contact with the reflective layer between the furrows even if the reflective layer comprises surface irregularities also called "telegraphing."

After the removal of the core 28 and the demolding film 26, the drainage plate 22 is made integral with the free surface of the reflective layer 16 in such a way that the furrows form evacuation pipes 20.

According to an operating mode, the zones between the furrows of the surface of the drainage plate 22 are coated with any product ensuring bonding, and said plate is applied against the reflective layer 16 of the panel. As a variant, the bonding can be replaced or completed by other attachment means.

Figure 5:
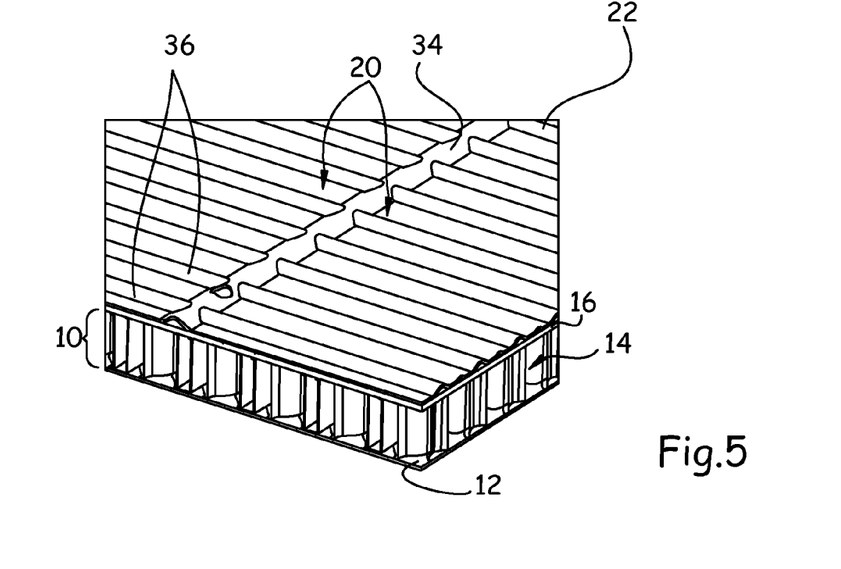
FIG. 5 is a perspective view of a panel for acoustic treatment incorporating a drainage plate according to the invention.

A panel for acoustic treatment is then obtained as illustrated in FIG. 5.

Figure 6:
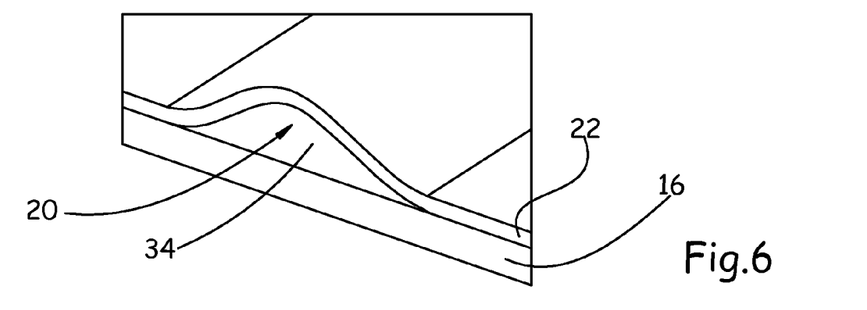
FIG. 6 is a cutaway that illustrates a primary pipe in detail.
Figure 7:
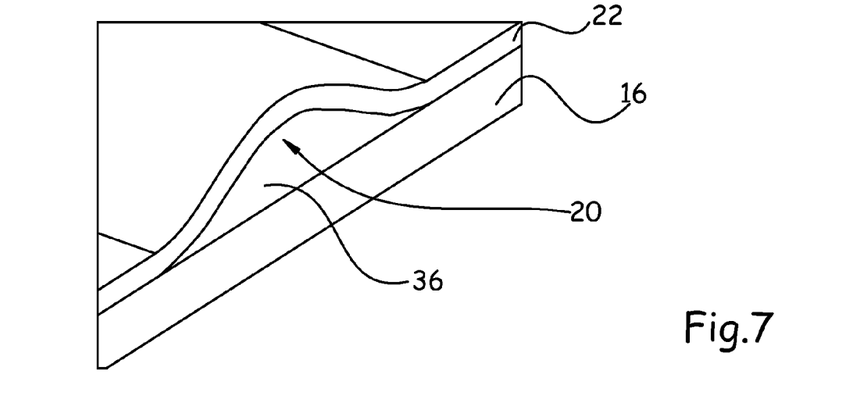
FIG. 7 is a cutaway that illustrates a secondary pipe.

According to the illustrated example, this panel comprises a primary pipe 34 whose cross-section is visible in detail in FIG. 6 and a number of secondary pipes 36 that empty into the primary pipe 34 of which a cross-section is visible in detail in FIG. 7.

Figure 8:
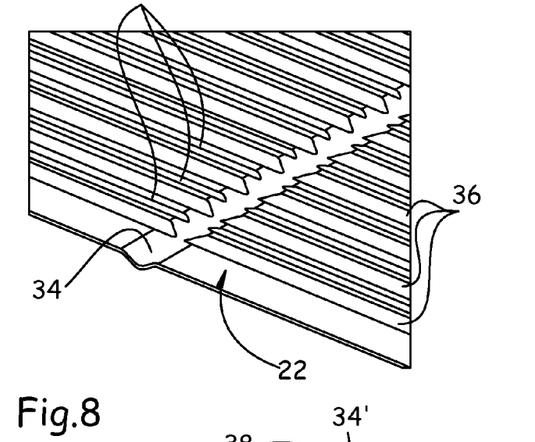
FIG. 8 is a perspective view of a drainage plate after demolding according to another variant of the invention.
Figure 9:
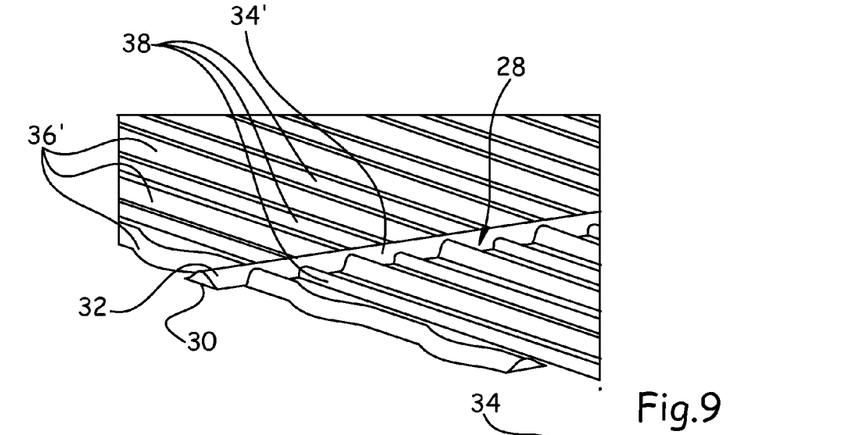
FIG. 9 is a perspective view of a core for obtaining the drainage plate of FIG. 8.
Figure 10:
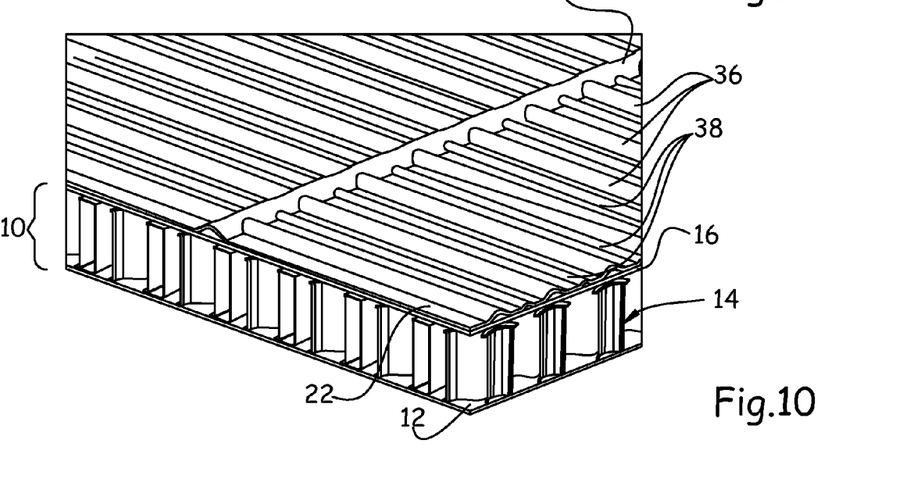
FIG. 10 is a perspective view of a panel for acoustic treatment that incorporates the drainage plate that is visible in FIG. 8.

According to another variant that is illustrated in FIGS. 8 to 10, it is possible to provide furrows for the adhesive 38 at the drainage plate 22. These adhesive furrows 38 are arranged in such a way as to ensure a good seal between two adjacent evacuation pipes 20.

According to the example illustrated in FIG. 8, the adhesive furrows 38 are provided between the secondary pipes 36.

Advantageously, the adhesive pipes 38 empty into the primary pipe 34. This arrangement makes it possible to obtain a core 28 in a single piece as illustrated in FIG. 9 with branches for the adhesive 38 provided for the adhesive furrows that are connected to the trunk 34' that is provided for the primary pipe between the branches 36' that are provided for the secondary pipes.

According to this operating mode, as above, the panel for acoustic treatment is shaped, if necessary, and its reflective layer is used as a mandrel.

After installation of the demolding film 26 and the core 28, the drainage plate 22 is molded by draping folds of pre-impregnated fibers and polymerization, for example.

Next, the drainage plate 22 is demolded, and the core 28 and the drainage film 26 are removed.

Contrary to the preceding operating mode, the product that is intended for the bonding of the drainage plate 22 is applied only at the adhesive furrows 38.

Finally, the drainage plate 22 is applied against the free surface of the reflective layer 16. A panel is obtained for the acoustic treatment as illustrated in FIG. 10.

This operating mode makes it possible to ensure an excellent seal between two adjacent evacuation pipes 20. In addition, this solution makes it possible to prevent the product that is used for bonding from migrating toward the secondary pipes, and it blocks them.

The invention claimed is:

1. A process for producing a panel for acoustic treatment that comprises an acoustically resistive porous layer, at least one alveolar structure, a reflective layer with openings, and a drainage plate that comprises at least one furrow constructed and arranged to delimit at least one evacuation pipe when said drainage plate is flattened against a free surface of the reflective layer, the process comprising:
    shaping the reflective layer according to a final geometry of the reflective layer;
    affixing a demolding film on at least one portion of the free surface of the reflective layer;
    positioning on the demolding film at least one core whose cross-section is adapted to that of the evacuation pipe in such a way that said at least one core covers the openings of the reflective layer;
    molding the drainage plate on said demolding film and said at least one core;
    demolding the drainage plate and removing said at least one core and said demolding film; and
    making the drainage plate integral with the free surface of the reflective layer;
    wherein the at least one alveolar structure is disposed between the acoustically resistive porous layer and the reflective layer.

2. The process for producing the panel for acoustic treatment according to claim 1, wherein the at least one core is made of a material constructed and arranged to deform in such a way as to adjust a geometry of the at least one core to that of the openings.

3. The process for producing the panel for acoustic treatment according to claim 2, wherein the at least one core is made of silicone.

4. The process for producing the panel for acoustic treatment according to claim 1, wherein the at least one core is constructed and arranged to be repositionable.

5. The process for producing the panel for acoustic treatment according to claim 1:
    wherein said panel comprises at least one primary pipe and secondary pipes,
    wherein during drainage, a first end of the secondary pipes empties into a primary pipe of the at least one primary pipe,
    wherein an other end of the secondary pipes is obstructed,
    wherein the at least one core comprises at least one trunk that corresponds to the at least one primary pipe and branches that correspond to the secondary pipes, the branches being connected to said at least one trunk.

6. The process for producing the panel for acoustic treatment according to claim 1, wherein the drainage plate is obtained by draping folds of fibers immersed in a resin matrix and by polymerization.

7. The process for producing the panel for acoustic treatment according to claim 1, wherein the drainage plate is made integral with the reflective layer by bonding with an adhesive.

8. The process for producing the panel for acoustic treatment according to claim 7:
wherein the positioning includes positioning the at least one core in such a way as to create furrows for the adhesive at the drainage plate,
wherein the making includes, after molding and demolding said drainage plate, arranging the adhesive in said furrows and then flattening said drainage plate against the free surface of the reflective layer so as to make the drainage plate and the reflective layer integral.

9. The process for producing the panel for acoustic treatment according to claim 8,
wherein said panel comprises at least one primary pipe and secondary pipes,
wherein during drainage, a first end of the secondary pipes empties into a primary pipe of the at least one primary pipe,
wherein an other end of the secondary pipes is obstructed,
wherein the at least one core comprises at least one trunk that corresponds to the at least one primary pipe and branches that correspond to the secondary pipes, the branches being connected to said at least one trunk, and branches for the adhesive provided for the furrows for the adhesive connected to the at least one trunk between the branches provided for the secondary pipes.

10. The process for producing the panel for acoustic treatment according to claim 2, wherein the at least one core is constructed and arranged to be repositionable.

11. The process for producing the panel for acoustic treatment according to claim 2:
wherein said panel comprises at least one primary pipe and secondary pipes,
wherein during drainage, a first end of the secondary pipes empties into a primary pipe of the at least one primary pipe,
wherein an other end of the secondary pipes is obstructed,
wherein the at least one core comprises at least one trunk that corresponds to the at least one primary pipe and branches that correspond to the secondary pipes, the branches being connected to said at least one trunk.

12. The process for producing the panel for acoustic treatment according to claim 2, wherein the drainage plate is obtained by draping folds of fibers immersed in a resin matrix and by polymerization.

13. The process for producing the panel for acoustic treatment according to claim 2, wherein the drainage plate is made integral with the reflective layer by bonding with an adhesive.

14. The process for producing the panel for acoustic treatment according to claim 3, wherein the at least one core is constructed and arranged to be repositionable.

15. The process for producing the panel for acoustic treatment according to claim 3:
wherein said panel comprises at least one primary pipe and secondary pipes,
wherein during drainage, a first end of the secondary pipes empties into a primary pipe of the at least one primary pipe,
wherein an other end of the secondary pipes is obstructed,
wherein the at least one core comprises at least one trunk that corresponds to the at least one primary pipe and branches that correspond to the secondary pipes, the branches being connected to said at least one trunk.

16. The process for producing the panel for acoustic treatment according to claim 3, wherein the drainage plate is obtained by draping folds of fibers immersed in a resin matrix and by polymerization.

17. The process for producing the panel for acoustic treatment according to claim 3, wherein the drainage plate is made integral with the reflective layer by bonding with an adhesive.

* * * * *

UNITED STATES PATENT AND TRADEMARK OFFICE
CERTIFICATE OF CORRECTION

PATENT NO. : 8,628,635 B2  Page 1 of 1
APPLICATION NO. : 13/147471
DATED : January 14, 2014
INVENTOR(S) : Chelin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 64 days.

Signed and Sealed this
Twenty-second Day of September, 2015

Michelle K. Lee
*Director of the United States Patent and Trademark Office*